US012747132B2

(12) United States Patent
Bhor et al.

(10) Patent No.: US 12,747,132 B2
(45) Date of Patent: Sep. 29, 2026

(54) ELEVATOR BUTTON PANEL CONTROLLER FOR PROVIDING CONTACTLESS ACCESS TO ELEVATOR BUTTON PANEL AND METHOD THEREOF

(71) Applicant: Inventio AG, Hergiswil (CH)

(72) Inventors: Amit Bhor, Pune Maharashtra (IN); Akshay Chaturvedi, Pune Maharashtra (IN); Varsha Trivedi, Pune Maharashtra (IN)

(73) Assignee: INVENTIO AG, Hergiswil (CH)

( * ) Notice: Subject to any disclaimer, the term of this patent is extended or adjusted under 35 U.S.C. 154(b) by 705 days.

(21) Appl. No.: 18/259,087

(22) PCT Filed: Dec. 6, 2021

(86) PCT No.: PCT/EP2021/084398
§ 371 (c)(1),
(2) Date: Jun. 23, 2023

(87) PCT Pub. No.: WO2022/144148
PCT Pub. Date: Jul. 7, 2022

(65) Prior Publication Data

US 2024/0051790 A1 Feb. 15, 2024

(30) Foreign Application Priority Data

Dec. 31, 2020 (EP) .................................... 20218010

(51) Int. Cl.
*B66B 1/46* (2006.01)
*B66B 1/52* (2006.01)

(52) U.S. Cl.
CPC .............. *B66B 1/468* (2013.01); *B66B 1/461* (2013.01); *B66B 1/52* (2013.01); *B66B 2201/4638* (2013.01)

(58) Field of Classification Search
None
See application file for complete search history.

(56) References Cited

U.S. PATENT DOCUMENTS 10,289,203 B1 5/2019 Liu et al.
2012/0120002 A1 5/2012 Ota
(Continued)

FOREIGN PATENT DOCUMENTS

CN 102647173 A 8/2012
CN 105980965 A 9/2016
(Continued)

*Primary Examiner* — Michelle M Iacoletti
(74) *Attorney, Agent, or Firm* — Shumaker, Loop & Kendrick, LLP

(57) ABSTRACT

A method for registering a user's request to provide contactless access to an elevator button panel includes: sensing, by a sensor associated with the elevator button panel, a motion of an object pointing towards the panel by the user; determining a distance of the object from the panel; comparing the distance with a distance threshold to determine whether the object is within the distance threshold indicating the user's request for activating a button on the panel; responding to the determination that the distance is within the distance threshold by determining a magnitude and a direction of a velocity of the object while in motion; and registering the user's request when the velocity magnitude of the object is greater than a threshold velocity magnitude, and the direction is a positive direction indicating the motion of the object towards the button the user intended to select.

15 Claims, 4 Drawing Sheets

(56) References Cited

U.S. PATENT DOCUMENTS

| | | | |
|---|---|---|---|
| 2014/0380249 | A1 | 12/2014 | Fleizach |
| 2019/0292011 | A1 | 9/2019 | Makela et al. |

FOREIGN PATENT DOCUMENTS

| | | | |
|---|---|---|---|
| CN | 106371759 | A | 2/2017 |
| CN | 107352340 | A | 11/2017 |
| CN | 109850708 | A | 6/2019 |
| CN | 110467076 | A | 11/2019 |
| JP | 2011162307 | A | 8/2011 |
| JP | 2019026417 | A | 2/2019 |
| JP | 6733622 | B2 | 7/2020 |
| KR | 20170136176 | A | 12/2017 |

ELEVATOR BUTTON PANEL CONTROLLER FOR PROVIDING CONTACTLESS ACCESS TO ELEVATOR BUTTON PANEL AND METHOD THEREOF

FIELD

The present invention relates to a field of elevators, and particularly, it relates to a method of providing users with a contactless access to an elevator button panel. Furthermore, the present invention relates to an elevator button panel controller for executing the proposed method and to an elevator installation with such a button panel.

BACKGROUND

Elevators are used very commonly by people as a mode of transport from one floor of a building to another, be it in multistorey apartments, commercial complexes, hospitals, malls, restaurants, and the like. However, in recent times elevator users have been reluctant to touch surfaces such as elevator buttons, door handles, etc. due to higher probability of virus transmission.

Contactless or touchless elevator technology has been known to exist that employs techniques such as quick response (QR) code scanning, an application installed on a user's smartphone or proximity sensors incorporated in the elevator buttons to detect a user and his/her gesture. However, each of the existing technologies has certain technical limitations. For instance, a user might forget to carry a smartphone or there might be connectivity issues that may hinder accessing the elevator button in a touchless/contactless mode. Also, there might be certain users such as the housekeeping staff, delivery agents, etc. that do not own a smartphone or are not capable of comprehending the instructions and therefore, cannot access the elevator button in a touch less/contactless mode.

Even when proximity sensors are incorporated with elevator buttons, they detect the proximity of a user around an elevator button and register a call simply based on a user's gesture. However, the technical challenge still faced while using such sensors is incapable of avoiding "nuisance calls" as it may so happen that the user within the proximity of the elevator button and performing a gesture might not actually intend for accessing the elevator button.

An alternative approach is described in JP2011162307A in which the destination floor registration is performed using a non-contact type button, and the position of the user's hand or the like is recognized even before the button operation is recognized. The operation panel is based on a distance measuring means for detecting a distance between an object such as a user's hand approaching the push buttons, and a distance between the object and the push button detected by the distance measuring means. The button for which the distance is below a predetermined threshold value is registered.

However, in such alternative approach, only the distance of the object from a button on the operation panel is taken into consideration which could still result in "nuisance calls" as there might be more than one object within the threshold distance. It would therefore, become difficult to register a call to the desired elevator button as the system would not be smart enough to deal with such a situation.

There is, therefore, a need for a technology that allows users to access the elevator buttons in a contactless/touchless mode by efficiently, quickly, and correctly understanding the user's intention. Further, there is a need for a method that requires only minimal further hardware to be provided in an elevator compared to conventional elevators.

SUMMARY

Such needs may be met with the subject-matter of the advantageous embodiments defined in the following specification.

According to an aspect of the present invention, a method for registering a user's request to provide contactless access to an elevator button panel is disclosed. The method comprises sensing, by a sensor associated with the elevator button panel, a motion of an object pointing towards the elevator button panel by a user. The method further comprises determining a distance of the object from the elevator button panel. The method further comprises comparing the distance of the object with a distance threshold to determine whether the object is within the distance threshold indicating an intention of the user for activating the button on the elevator button panel. The method further comprises determining, in response to the determination that the distance is within the distance threshold, a magnitude and a direction of a velocity of the object while being in the motion. The method further comprises registering the user's request for activating the button when the magnitude of the velocity of the object is greater than the magnitude of a threshold velocity, and also the direction is a positive direction indicating the motion of the object towards the button that the user intended to activate.

According to another aspect of the present invention, the distance of the object from the elevator button panel is determined by measuring a time difference between a signal emitted from the sensor and a corresponding signal received by the sensor after being reflected from the object and the magnitude of the velocity of the object is determined based on the distance and the time difference associated with the object.

According to yet another aspect of the present invention, upon sensing a plurality of objects simultaneously pointing towards the elevator button panel, the method further comprises determining a plurality of distances corresponding to the plurality of objects in such a manner that each distance corresponds to each object, such that the plurality of distances determined is within the distance threshold and selecting an object, amongst the plurality of objects, having the shortest distance from the elevator button panel based on the plurality of distances determined.

According to yet another aspect of the present invention, the sensor comprises at least one of a time of flight (ToF) optical sensor and an ambient light sensor packaged on a single chip, and wherein the ambient light sensor is capable of detecting ambient light within a sensing range the sensor.

According to yet another aspect of the present invention, the method further comprises providing a first notification and a second notification to the user. The first notification is provided, in response to the object crossing the distance threshold, to the user regarding the selection of the button the user intended to select, and the second notification is provided to the user confirming that the elevator button panel has registered the user's request for providing the contactless access to the button.

According to yet another aspect of the present invention, the first notification and/or the second notification are generated/sent in the form of at least one of an audio type notification, a visual type notification, and a combination thereof.

According to yet another aspect of the present invention, the method further comprises providing, when the first notification and the second notification is the visual type notification, the first notification as a blinking type notification and the second notification as a solid type notification using a light-emitting diode (LED) embedded with the elevator button panel.

According to yet another aspect of the present invention, an elevator button panel controller for registering a user's request to provide contactless access to an elevator button panel is disclosed. The elevator button panel controller comprises a sensor, associated with the elevator button panel, and being capable of sensing a motion of an object pointing towards the elevator button panel by a user. The elevator button panel controller further comprises a distance determination unit being capable of determining a distance of the object from the elevator button panel. The elevator button panel controller further comprises a comparison unit being capable of comparing the distance of the object with a distance threshold to determine whether the object is within the distance threshold indicating an intention of the user for activating the button on the elevator button panel. The elevator button panel controller further comprises a velocity determination unit being capable of determining, in response to the determination that the distance is within the distance threshold, a magnitude and a direction of a velocity of the object while being in motion. The elevator button panel controller further comprises an output unit being capable of registering the user's request for activating the button when the magnitude of the velocity of the object is greater than the magnitude of a threshold velocity, and also the direction is a positive direction indicating the motion of the object towards the button that the user intended to activate.

According to yet another aspect of the present invention, the distance determination unit is capable of determining the distance of the object from the elevator button panel by measuring a time difference between a signal emitted from the sensor and a corresponding signal received by the sensor after being reflected from the object and the velocity determination unit is capable of determining the magnitude of the velocity of the object based on the distance and the time difference associated with the object.

According to yet another aspect of the present invention, upon sensing a plurality of objects simultaneously pointing towards the elevator button panel, the elevator button panel further being capable of enabling the distance determination unit to determine a plurality of distances corresponding to the plurality of objects in such a manner that each distance corresponds to each object, such that the plurality of distances determined is within the distance threshold. The elevator button panel further being capable of enabling a selection unit to select an object, amongst the plurality of objects, having the shortest distance from the elevator button panel based on the plurality of distances determined.

According to yet another aspect of the present invention, the sensor comprises at least one of a time of flight (ToF) optical sensor and an ambient light sensor packaged on a single chip, and wherein the ambient light sensor is capable of detecting ambient light within a sensing range the sensor.

According to yet another aspect of the present invention, the output unit is further capable of providing a first notification and a second notification to the user. The first notification is provided, in response to the object crossing the distance threshold, to the user regarding the selection of the button the user intended to select, and the second notification is provided to the user confirming that the elevator button panel has registered the user's request for providing the contactless access to the button.

According to yet another aspect of the present invention, the first notification and/or the second notification are generated/sent in the form of at least one of an audio type notification, a visual type notification, and a combination thereof.

According to yet another aspect of the present invention, the elevator button panel controller being further capable of providing, when the first notification and the second notification is the visual type notification, the first notification as a blinking type notification and the second notification as a solid type notification using a light-emitting diode (LED) embedded with the elevator button panel.

According to yet another aspect of the present invention, an elevator installation with an elevator button panel is described. The elevator button panel is communicatively coupled with the elevator button panel controller. The elevator button panel comprises at least one of a car operating panel (COP) and a landing operating panel (LOP). According to embodiments of the present disclosure, the COP may be placed inside an elevator car, whereas the LOP may be placed outside the elevator car, for example, in a lobby area.

Ideas underlying embodiments of the present invention may be interpreted as being based, inter alia, on the following observations and recognitions.

As briefly indicated in the introductory portion, technical approaches have been proposed for registering user's request to provide contactless access to an elevator button panel. In such prior art approaches, sensors determining the proximity of a user's hand to the button panel were used and based on user gestures a contactless call was registered.

However, in such prior art approaches, due to the use of sensors to determine the proximity of the user's hand and registering a call based on hand gestures, nuisance calls may occur. Further, other prior art approaches are dependent on the use of a mobile device by a user to register a contact-less call to an elevator button.

It has now been realized that in such prior art approaches, an excessive number of nuisance calls may occur. Such nuisance calls may be registered as the system is not smart enough to understand the intention of the user.

Further, in other prior art approaches, the dependency on a mobile device to access an elevator button in contactless mode, poses a limit on its use by people who do not possess a mobile device or due to poor connectivity.

In order to reduce the likelihood of such "nuisance calls" and limit the dependency on a mobile device for accessing an elevator button panel in a contact-less mode, it is therefore proposed herein to consider the distance, velocity of an object in order to provide an efficient and hassle-free technique to access the elevator buttons in a contactless/touchless mode. The object associated with the user may be his/her fingers or any other item used by the user. With respect to distance as a factor, the distance of the object associated with the user has to be within a distance threshold prefixed by the elevator button panel controller. Here, it may be understood that the distance threshold helps the elevator button panel controller to avoid analyzing other objects which are in proximity of an elevator button panel but not in its distance threshold range. In other words, it can be said that considering the distance factor provides the first level of filter by the elevator button panel controller while ascertaining the selection of the object pointing towards the elevator button. Further, another factor considered by the elevator button panel controller is the velocity of the object that needs to be greater than the magnitude of a threshold velocity prefixed by the elevator button panel controller and the direction of motion of the object that needs to be towards the elevator button. This way, the consideration of the velocity factor further helps the elevator button panel controller in deciding the user's intention towards the elevator button he/she wants to select, and accordingly selecting that elevator button on the elevator button panel.

Thus, a call to the elevator button gets registered only when an object moving towards the elevator button with a velocity greater than the threshold velocity crosses a distance threshold. This technique not just provides a quick and accurate prediction of the user's intention but also avoids nuisance calls that may occur when only the proximity of the object associated with the user with respect to the elevator button is considered.

In the following, an embodiment of the method proposed herein will be described in relation to an example in which a user pointing an object towards the elevator button panel wants to access an elevator button in contact-less mode. An object may be said to pointing toward the elevator button panel if the object is moving within sensing distance of the sensor associated with the panel.

In order to determine, that an object associated with a user is in motion towards the elevator button panel, a sensor is employed. A sensor is associated with each of the buttons on the elevator button panel and when the object is within the sensing range of any of the elevator buttons, it is sensed by the sensor.

In one embodiment, the sensor comprises a time of flight (ToF) optical sensor. In another embodiment, the sensor may include an ambient light sensor packaged together with the time of flight (ToF) optical sensor on a single chip. The ambient light sensor is capable of detecting ambient light within the sensing range of the sensor.

Further, the sensor calculates the distance of the object from the elevator button panel by measuring a time difference between a signal emitted from the sensor and a corresponding signal received by the sensor after being reflected from the object.

Further, the calculated distance is compared with a predefined distance threshold to determine whether the object is within the distance threshold. This acts as a first filter. If the object associated with the user is within the distance threshold, it is determined that the user is requesting to activate a button on the elevator button panel.

In one embodiment, a first notification is provided to user when the object crosses the distance threshold. The first notification simply marks user's intention of selecting the button. The first notification thus informs the user that based on the motion of the object associated with him/her, a particular button on the elevator button panel is selected. Thus, if the user does not intend to select the particular button, he/she can withdraw the object and proceed accordingly. The first notification can be an audio type notification, a visual notification or a combination thereof. Further, when the first notification is of visual-type, a blinking type notification is provided using a light-emitting diode (LED) embedded with the elevator button panel.

Further, once it has been determined that the user is requesting to activate a button on the elevator button panel, the method applies a second filter to reconfirm user's intention. The second filter is the determination of magnitude and direction of velocity of the object associated with the user. The magnitude of velocity of the object is determined based on the distance of the object and the time difference associated with the object. Further, the determination of direction of velocity asserts whether the object is moving towards the elevator button panel or is receding away from the elevator button panel.

Further, a determination is made as to whether the magnitude of the velocity of the object is greater than the magnitude of a threshold velocity. Based on the determination, the user's request to activate the button is registered when the magnitude of the velocity is greater than the magnitude of velocity threshold and the direction of velocity is towards the elevator button panel.

Further, when the user's request to activate the button is registered, the user is provided with a second notification. The second notification can be an audio type notification, a visual notification or a combination thereof. Further, when the second notification is of visual-type, a solid-type notification is provided using a light-emitting diode (LED) embedded with the elevator button panel. In some cases, a high brightness mode of the LED is considered as the solid-type notification.

Further, in one embodiment, it may so happen that multiple objects are pointing simultaneously towards the elevator button panel and the distance of each object is within the distance threshold. Conventionally, it would become difficult to determine the user's intention in such cases. However, in the proposed invention, this issue is tackled by selecting an object from the multiple objects having the shortest distance from the elevator button panel.

Embodiments of the method proposed herein may be executed, performed or controlled in an elevator button panel controller. For such purpose, the elevator button controller comprises a sensor and various processing units such as distance determination unit, comparison unit, velocity determination unit and output unit. The proposed method may be implemented using hardware, software or a combination of both.

It shall be noted that possible features and advantages of embodiments of the invention are described herein partly with respect to a method for registering user's request to provide contactless access of an elevator button panel, partly with respect to the elevator button panel controller for performing this method and partly with respect to elevator installation with such a button panel. One skilled in the art will recognize that the features may be suitably transferred from one embodiment to another and features may be modified, adapted, combined and/or replaced, etc. in order to come to further embodiments of the invention.

In the following, advantageous embodiments of the invention will be described with reference to the enclosed drawings. However, neither the drawings nor the description shall be interpreted as limiting the invention.

The figures are only schematic and not to scale. Same reference signs refer to the same or similar features.

DETAILED DESCRIPTION

Figure 1A:
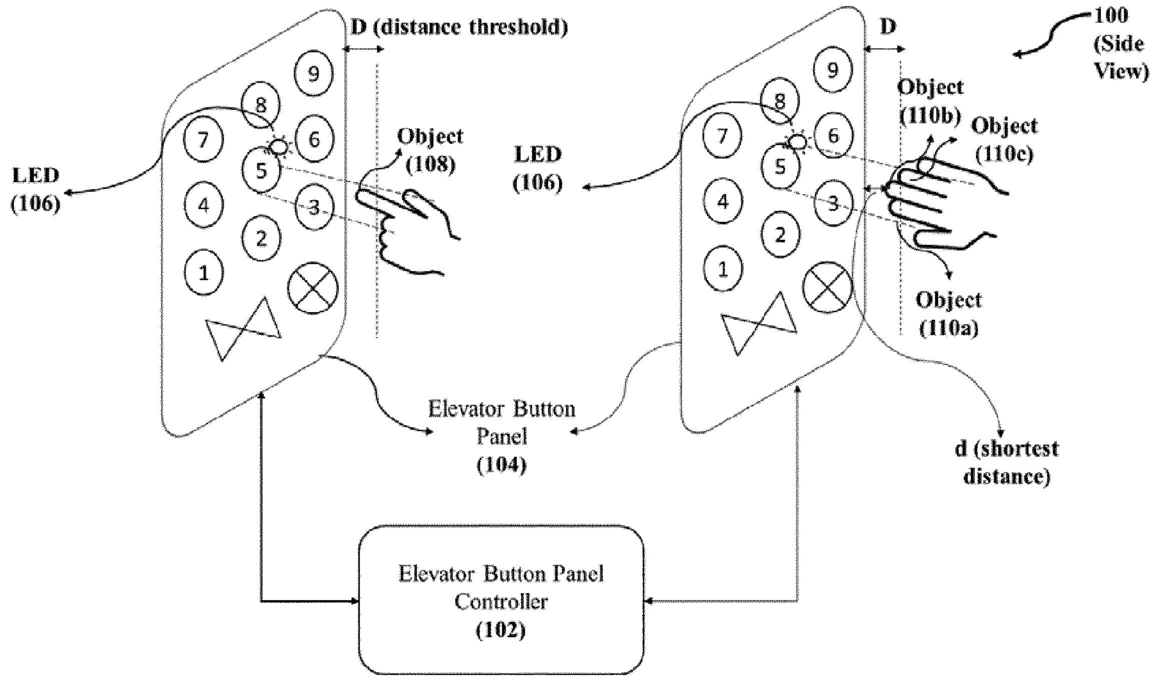
FIGS. 1A and 1B show side view and top view of an exemplary environment 100 of an elevator button panel controller for registering user's request to provide contactless access of an elevator button panel to users in accordance with an embodiment of the present disclosure.
Figure 1B:
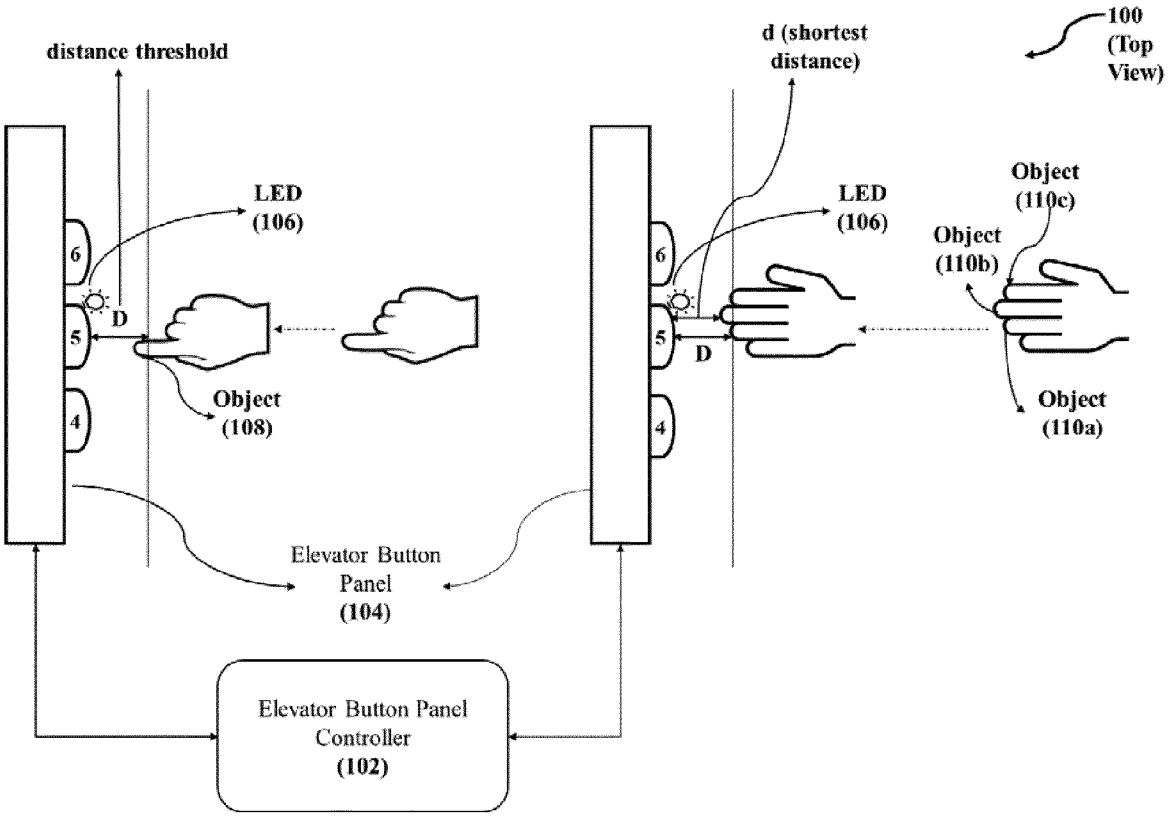

FIGS. 1A and 1B show the side view and top view of an exemplary environment 100 of an elevator button panel controller (hereinafter also referred as "panel controller") for registering user's request to provide contactless access of an elevator button panel to users in accordance with an embodiment of the present disclosure. In one embodiment, the elevator button panel may be completely touch-less in the form of a liquid crystal display. In another embodiment, a conventional elevator can be modified with help of minimal hardware to provide contact-less functionality. Various technologies can be employed for the interactive surface of the elevator button panel such as capacitive touch (e.g., surface capacitance, projected capacitance, etc.), infrared grid, infrared acrylic projection, optical imaging, dispersive signal technology, and acoustic pulse recognition. It must be understood to a person skilled in the art that the panel controller may also be implemented in various environments, other than as shown in FIGS. 1A and 1B. Further, the exemplary environment 100 has been shown in different views such as the side view and the top view to provide better clarity towards understanding the invention.

Figure 2:
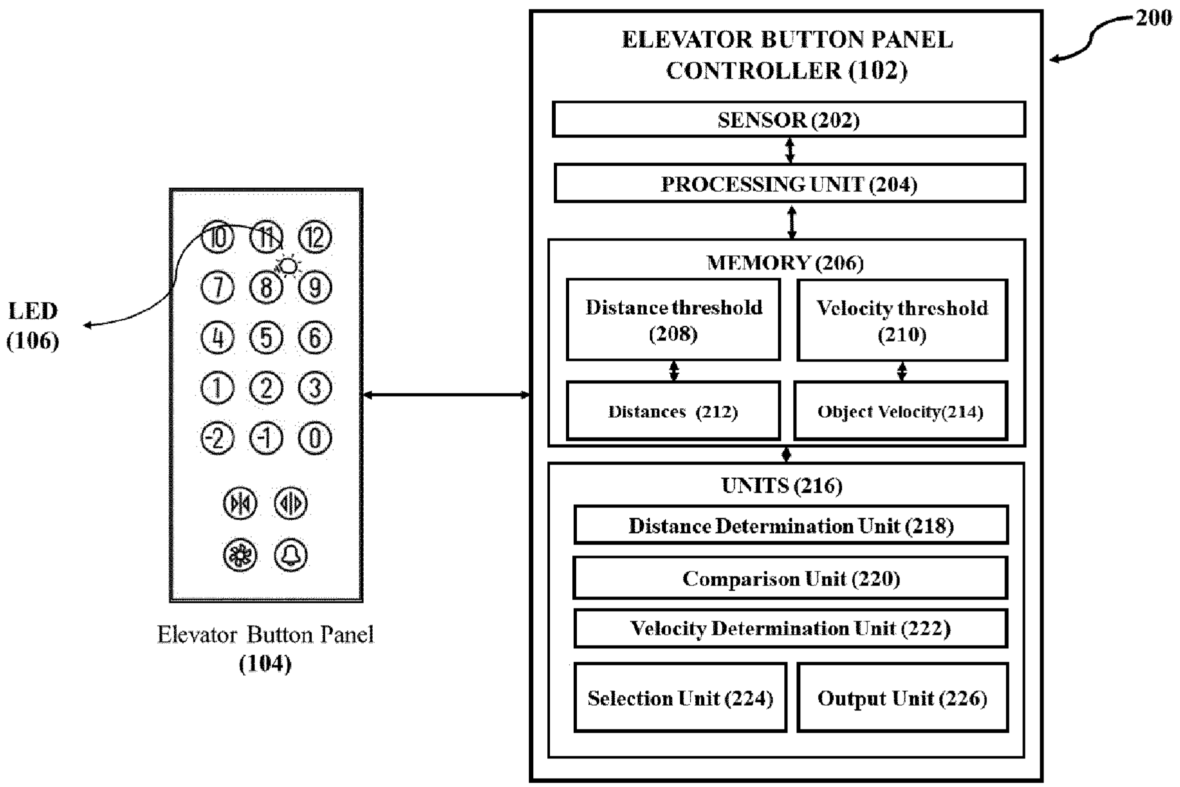
FIG. 2 shows a block diagram 200 illustrating an elevator button panel controller for registering user's request to provide contactless access of an elevator button panel to users in accordance with an embodiment of the present disclosure.

The detailed explanation of the exemplary environment 100 is explained in conjunction with FIG. 2 that shows a block diagram 200 of the panel controller 102 for registering the user's request to provide contactless access of an elevator button panel to users in accordance with an embodiment of the present disclosure. According to an embodiment, the panel controller 102 may be coupled to an elevator button panel 104 associated with an elevator in a multistorey building. The elevator button panel 104 may be a button panel placed inside the elevator or a call button panel placed outside the elevator. The panel controller 102 may comprise a sensor 202, a processing unit 204, a memory 206 and units 216. The memory 206 may be communicatively coupled to the processing unit 204 and the units 216. Further, the memory 206 may store a value for distance threshold D, 208, and a value for each of magnitude of threshold velocity 210, determined distances 212 and determined velocity 214. The significance and use of each of the stored quantities are explained in the upcoming paragraphs of the specification.

Further, the sensor 202 may comprise an array of sensors such that each sensor of the array of sensors is associated with a button on the elevator button panel 104. Furthermore, each sensor may comprise a time of flight (ToF) optical sensor and an ambient light sensor packaged on a single chip. A ToF optical sensor is a device that measures distance using light. In operation, a ToF sensor emits carefully controlled light toward an object in its periphery. Some of the light that impinges on the object is reflected to the sensor, where it is detected, processed, and compared to the emitted light. In one embodiment, the controlled light is delivered as short pulses. In this case, the distance of the object is determined by measuring the elapsed time from transmission to reception. In another embodiment, modulated light can be used and the phase delay of returning light can be measured to determine the distance of the object. Each of the buttons on the elevator button panel 104 may be incorporated with a light emitting diode (LED) 106 to provide notifications (first notification and second notification) to a user confirming the selection of an elevator button. The LED 106 may be a single LED provided alongside an elevator button or maybe in the form of a strip surrounding the elevator button. In another embodiment, an organic LEDs (OLED) that use an organic compound as the emissive electroluminescent layer may also be used to provide visual notification. According to other embodiments of the present disclosure, the panel controller 102 may also provide the notification using audio means i.e., audio-type notification or by using a combination of audio-visual means i.e., a combination of audio-visual notification. Further, the units 216 may comprise a distance determination unit 218, a comparison unit 220, a velocity determination unit 222, a selection unit 224 and an output unit 226. According to embodiments of the present disclosure, these units 218-226 and the processing unit 204 may comprise hardware components like processor, microprocessor, microcontrollers, and application-specific integrated circuit for performing various operations of the panel controller 102. It must be understood to a person skilled in the art that the processing unit 204 may perform all the functions of the units 218-226 according to various embodiments of the present disclosure.

Now referring back to FIGS. 1A and 1B, the environment 100 depicts two distinct embodiments of a method for providing contactless access of the elevator button panel 104 to users. In one exemplary embodiment as shown on the left-hand side of the FIGS. 1A and 1B, the environment 100 depicts an object 108 in the vicinity of the elevator button panel 104. The object 108 may be a finger on a user's hand or user's palm or an item such as a key, a stick, a toothpick, etc. used by the user for accessing the elevator button. The motion of the object 108 pointing towards an elevator button on the elevator button panel 104 is sensed by the sensor 202. To understand the user's intention of accessing the elevator button, the distance determination unit 218 determines a distance of the object 108 from the elevator button of the elevator button panel 104. Further, irrespective of the kind of object, the distance to the object is determined from a geometric center of the object 108.

As can be seen from FIGS. 1A and 1B, the distance of the object 108 is determined from the elevator button corresponding to "floor 5" as the object 108 is within a sensing range of the sensor associated with the elevator button corresponding to the floor 5. The distance of the object 108 is determined based on the time of flight technique i.e., by calculating the time taken (time difference) by an optical signal to strike the object 108 and return to the sensor 202 after striking the object 108. This time taken is then multiplied with the speed of the optical signal to determine the distance of the object 108.

Once the distance 212 of the object 108 is determined, in the next step, the comparison unit 220 compares the determined distance 212 with a distance threshold D, 208 pre-stored in the memory 206 of the panel controller 102. As discussed above, the distance determination of the object within the distance threshold D, 208 helps the panel controller 102 to choose the corresponding elevator button (in this case "floor 5") on the elevator button panel 104. As soon as it is confirmed that the distance of the object 108 is within the distance threshold D, 208, the panel controller 102 immediately also provides a blinking-type notification (first notification as a visual type notification) to the user via the LED 106. The blinking notification thus ascertains the user's intention of accessing the elevator button corresponding to the floor 5. According to other embodiments of the present disclosure, the first notification in the form of the visual type notification may be provided by changing colors of the LED, for example "green" indicating selected and "red" indicating not selected for ascertaining user's request of accessing the elevator button.

However, at this stage, providing the contactless access to the elevator button corresponding to floor 5 may not be considered to be final as the blinking notification only provides the user an indication, that based on the position of the object 108 associated with him/her, it appears that he/she wants to access the elevator button corresponding to the floor 5. This thus also gives a chance to the user to modify the position of the object 108 associated with him/her in order to point towards the correct elevator button, if required. This step thus allows avoiding any nuisance calls that may get registered due to the incorrect position of the object 108 associated with the user.

Once it has been ascertained that the user indeed wants to access the elevator button corresponding to the floor 5, the velocity determination unit 222 determines the magnitude and the direction of the velocity of the object 108 while the object is in motion. The determined magnitude of velocity 214 of the object 108 is compared with a magnitude of threshold velocity 210 prestored in the memory 206 of the panel controller 102. Here, the magnitude of threshold velocity 210 refers to a predefined threshold speed. Further, from the determined direction of the velocity of the object 108, it is determined whether the object 108 is moving towards or away from the elevator button corresponding to floor 5. If the determined magnitude of velocity 214 of the object 108 is above the magnitude of threshold velocity 210 and the direction of the velocity of the object 108 is towards the elevator button corresponding to floor 5, the output unit 224 provides a bold-type notification (second notification as a visual type notification) to the user via the LED 106 confirming that a call to the elevator button corresponding to floor 5 has been registered and thus providing contactless access to the elevator button panel 104. According to other embodiments of the present disclosure, the second notification in the form of the visual type notification may be provided by changing colors of the LED, for example turning the color from green (indicative of first notification) to "yellow" indicating that the user's request for activating the button is registered. It may be understood to the skilled person that the first and the second notification may also be provided as a combination of visual and audio type notification or vice-versa. For example, upon detecting the object's distance within the distance threshold, a visual type notification may be provided (first notification) by turning the color of LED corresponding to "Floor 5" as "green" followed by an audio type notification (second notification) as "Your request for Floor 5 is registered".

In another exemplary embodiment, as shown on the right-hand side of FIGS. 1A and 1B, it may so happen that the user intentionally or unintentionally points a plurality of objects 110*a*, 110*b*, 110*c* towards the elevator button panel 104 such that different objects simultaneously come within the sensing range of different elevator buttons. For instance, as shown on the right-hand side of the FIG. 1A, objects 110*a* and 110*b* are within the sensing range of the elevator button corresponding to floor 5, while object 110*c* is also partly within the sensing range of the elevator button corresponding to floor 6. Moreover, the distances of each of the objects (110*a*, 110*b*, 110*c*) are within the distance threshold D, 208. In such a scenario, it may conventionally become difficult to understand the intention of the user. However, the panel controller 102 of the present disclosure is robust enough to understand such a situation and ultimately selects, by means of the selection unit 224, the object 110*b* having the shortest distance, d from the elevator button panel 104, thereby understanding that the user intends on registering a call to the elevator button corresponding to floor 5 and not floor 6.

Further, to register a call to the elevator button corresponding to floor 5, the panel controller 102 by means of the velocity determination unit 222 determines a magnitude and a direction of the velocity of the object 110*b* while the object is in motion and compares the determined magnitude of velocity 214 of the object 110*b* with the velocity threshold 210 prestored in the memory 206 of the elevator button panel controller 102. It then determines whether the object 110*b* is moving towards or away from the elevator button corresponding to floor 5. The output unit 226 provides a bold-type notification to the user via the LED 106 confirming that a call to the elevator button corresponding to floor 5 has been registered and thus providing contactless access to the elevator button panel 104, if the determined magnitude of velocity 214 of the object 110*b* is above the magnitude of threshold velocity 210 and the direction of the velocity of the object 108 is towards the elevator button corresponding to floor 5.

Figure 3:
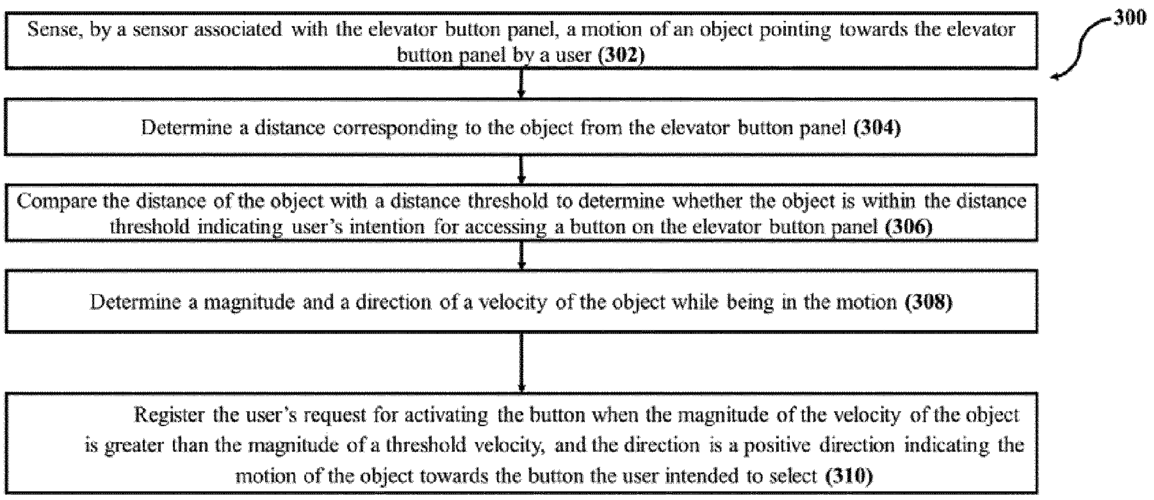
FIG. 3 shows a method 300 for registering user's request to provide contactless access of an elevator button panel to users in accordance with an embodiment of the present disclosure.

FIG. 3 depicts a method 300 for registering the user's request to provide contactless access of an elevator button panel to users in accordance with an embodiment of the present disclosure.

As illustrated in FIG. 3, the method 300 includes one or more blocks illustrating steps of a method for registering the user's request to provide contactless access of an elevator button panel to users. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein.

At block 302, the method 300 may include sensing, by a sensor 202 associated with the elevator button panel 104, a motion of an object 108 pointing towards the elevator button panel 104 by a user.

At block 304, the method 300 may include determining a distance 212 corresponding to the object 108 from the elevator button panel 104. The distance of the object 108 is determined based on the time of flight technique i.e., by calculating the time taken by an optical signal to strike the object 108 and return to the sensor 202 after striking the object 108. The time taken is then multiplied with the speed of the optical signal to determine the distance of the object 108.

At block 306, the method 300 may include comparing the distance 212 of the object 108 with a distance threshold 208 to determine whether the object 108 is within the distance threshold 208 indicating the user's intention for accessing a button on the elevator button panel 104.

At block 308, the method 300 may include determining a magnitude and a direction of a velocity 214 of the object 108 while being in the motion.

At block 310, the method 300 may include registering the user's request for activating the button when it is determined that the magnitude of the velocity 214 of the object 108 is greater than the magnitude of a threshold velocity 210, and the direction determined is a positive direction indicating the motion of the object 108 towards the button the user intended to select.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein is related to elevators, aspects of this disclosure may also be applied in connection with other types of conveyance or transportation devices, such as a dumbwaiter, an escalator, a moving sidewalk, a wheelchair lift and the like which will be apparent to those skilled in the art. The various aspects and embodiments disclosed herein are for purposes of illustration and are not intended to be limiting, with the true scope and spirit being indicated by the following claims.

In accordance with the provisions of the patent statutes, the present invention has been described in what is considered to represent its preferred embodiment. However, it should be noted that the invention can be practiced otherwise than as specifically illustrated and described without departing from its spirit or scope.

We claim:

1. A method for registering a user's request to provide contactless access to an elevator button panel, the method comprising the steps of:

- sensing, by a sensor associated with the elevator button panel, a motion of an object pointing towards the elevator button panel by a user;
- determining a distance of the object from the elevator button panel;
- comparing the distance of the object with a predetermined distance threshold and determining whether the object is within the distance threshold thereby indicating an intention of the user for activating a button on the elevator button panel;
- in response to the determination that the distance is within the distance threshold, determining a magnitude and a direction of a velocity of the object while the object is in the motion; and
- registering the user's request for activating the button when the magnitude of the velocity of the object is greater than a magnitude of a predetermined threshold velocity, and the direction of the velocity of the object is a positive direction indicating the motion of the object is towards the button that the user intended to activate.

2. The method according to claim 1 including determining the distance of the object from the elevator button panel by measuring a time difference between a signal emitted from the sensor and a corresponding signal received by the sensor after the emitted signal is reflected from the object, and determining the magnitude of the velocity of the object based on the determined distance and the measured time difference.

3. The method according to claim 1 including upon sensing a plurality of objects simultaneously pointing towards the elevator button panel, determining a plurality of distances of the objects from the elevator button panel, each of the distances corresponding to an associated one of the objects and being within the distance threshold, and selecting a one of the objects having a shortest determined distance from the elevator button panel as the object indicating the intention of the user for activating the button on the elevator button panel.

4. The method according to claim 1 wherein the sensor includes at least one of a time of flight optical sensor and an ambient light sensor packaged on a single chip, and wherein the ambient light sensor detects ambient light within a sensing range of the ambient light sensor.

5. The method according to claim 1 including providing a first notification and a second notification to the user, wherein the first notification is provided in response to the object crossing the distance threshold to inform the user of the button to be activated, and wherein the second notification is provided to confirm that the elevator button panel has registered the user's request.

6. The method according to claim 5 wherein the first notification and/or the second notification is generated as at least one of an audio type notification, a visual type notification, and a combination of the audio type notification and the visual type notification.

7. The method according to claim 5 including using a light-emitting diode embedded with the elevator button panel to provide the first notification as a blinking type visual notification and the second notification as a solid type visual notification.

8. An elevator button panel controller for registering a user's request to provide contactless access to an elevator button panel, the elevator button panel controller comprising:

- a sensor associated with the elevator button panel and adapted to sense a motion of an object pointing towards the elevator button panel by a user;
- a distance determination unit determining a distance of the object from the elevator button panel based upon the motion sensed by the sensor;
- a comparison unit comparing the distance of the object with a predetermined distance threshold to determine when the object is within the distance threshold thereby indicating an intention of the user for activating a button on the elevator button panel;
- a velocity determination unit responsive to the determination that the distance is within the distance threshold to determine a magnitude and a direction of a velocity of the object while the object is in the motion; and
- an output unit registering the user's request for activating the button when the magnitude of the velocity of the object is greater than a magnitude of a predetermined threshold velocity, and the direction is a positive direction indicating the motion of the object is towards the button that the user intended to activate.

9. The elevator button panel controller according to claim 8 wherein the distance determination unit determines the distance of the object from the elevator button panel by measuring a time difference between a signal emitted from the sensor and a corresponding signal received by the sensor after the emitted signal is reflected from the object, and the velocity determination unit determines the magnitude of the velocity of the object based on the determined distance and the time difference.

10. The elevator button panel controller according to claim 8 wherein when the sensor senses a plurality of objects simultaneously pointing towards the elevator button panel, the distance determination unit determines a plurality of distances of the objects from the elevator button panel, each of the distances corresponding to an associated one of the objects and being within the distance threshold, and a selection unit of the elevator button panel controller selects a one of the objects having a shortest determined distance from the elevator button panel as the object indicating the intention of the user.

11. The elevator button panel controller according to claim 8 wherein the sensor includes at least one of a time of flight optical sensor and an ambient light sensor packaged on a single chip, and wherein the ambient light sensor detects ambient light within a sensing range the ambient light sensor.

12. The elevator button panel controller according to claim 8 wherein the output unit provides a first notification and a second notification to the user, wherein the first notification is provided in response to the object crossing the distance threshold to inform the user of the button to be activated, and wherein the second notification is provided to confirm that the elevator button panel has registered user's request.

13. The elevator button panel controller according to claim 12 wherein the first notification and/or the second notification is generated as at least one of an audio type notification, a visual type notification, and a combination of the audio type notification and the visual type notification.

14. The elevator button panel controller according to claim 12 including using a light-emitting diode embedded with the elevator button panel to provide the first notification as a blinking visual type notification and the second notification as a solid type visual notification.

15. An elevator installation comprising:

an elevator button panel;

an elevator button panel controller according to claim 8 communicatively coupled to the elevator button panel; and wherein the elevator button panel is at least one of a car operating panel and a landing operating panel.

* * * * *